United States Patent
Milanovic et al.

(10) Patent No.: US 12,266,817 B2
(45) Date of Patent: Apr. 1, 2025

(54) BATTERY PACK HOUSING

(71) Applicant: Cummins Inc., Columbus, IN (US)

(72) Inventors: Nick Milanovic, Columbus, IN (US); Deepak Kovaichelvan, Columbus, IN (US); Chao Ma, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/591,452

(22) Filed: Feb. 2, 2022

(65) Prior Publication Data

US 2022/0247028 A1    Aug. 4, 2022

(30) Foreign Application Priority Data

Feb. 3, 2021   (GB) .................................... 2101499

(51) Int. Cl.
*H01M 50/271*  (2021.01)
*H01M 50/204*  (2021.01)
*H01M 50/249*  (2021.01)

(52) U.S. Cl.
CPC ....... *H01M 50/271* (2021.01); *H01M 50/204* (2021.01); *H01M 50/249* (2021.01); *H01M 2220/20* (2013.01)

(58) Field of Classification Search
CPC ............................................... H01M 2220/20
See application file for complete search history.

(56) References Cited

U.S. PATENT DOCUMENTS

| | | | |
|---|---|---|---|
| 9,012,052 B2 | 4/2015 | Kim | |
| 9,236,593 B2 | 1/2016 | Chuang et al. | |
| 9,761,851 B2 | 9/2017 | Onodera et al. | |
| 2005/0079412 A1 | 4/2005 | Kim | |
| 2016/0293914 A1 | 10/2016 | Miller et al. | |
| 2018/0083243 A1 | 3/2018 | Brausse | |
| 2020/0028135 A1 | 1/2020 | Shepherd | |
| 2020/0148066 A1 | 5/2020 | Sekar et al. | |
| 2020/0411815 A1 * | 12/2020 | Shin | H01M 10/4207 |

FOREIGN PATENT DOCUMENTS

| | | |
|---|---|---|
| CN | 102190968 B | 9/2011 |
| CN | 103560263 B | 2/2014 |
| CN | 203941956 U | 11/2014 |
| CN | 204577479 U | 8/2015 |

(Continued)

OTHER PUBLICATIONS

WO2011134815A1 Machine Translation (Year: 2011).*

(Continued)

*Primary Examiner* — Jonathan G Leong
*Assistant Examiner* — Aryana Y. Ortiz
(74) *Attorney, Agent, or Firm* — Faegre Drinker Biddle & Reath LLP

(57) ABSTRACT

A battery pack housing for a battery pack comprising a plurality of battery cells is disclosed. The battery pack housing comprises a surround frame (20), the surround frame comprising a plurality of walls arranged to surround the battery cells (40), and a top panel (22) which is attached to the walls of the surround frame to form the top of the battery pack housing. The top panel (22) is attached to the surround frame (20) using an adhesive (50). The top panel (22) is removable from the surround frame (20) to allow access to internal components of the battery pack.

17 Claims, 8 Drawing Sheets

(56) References Cited

FOREIGN PATENT DOCUMENTS

| | | |
|---|---|---|
| CN | 106299175 B | 1/2017 |
| CN | 108110184 A | 6/2018 |
| CN | 208198085 U | 12/2018 |
| CN | 210136922 U | 3/2020 |
| DE | 102013200560 A1 | 7/2014 |
| DE | 102013102283 A1 | 9/2014 |
| DE | 102016107372 A1 | 10/2017 |
| EP | 1544917 A1 | 6/2005 |
| EP | 3454391 A1 | 3/2019 |
| EP | 3644398 A1 | 4/2020 |
| WO | WO-2011134815 A1 * 11/2011 .......... H01M 2/1072 |

OTHER PUBLICATIONS

Industrial Adhesives & Tapes Division, "Battery Bonding Guide" pp. 1-9 (See IDS) (Year: 2020).*
Industrial Adhesives & Tape Division, "Multi-Material and Composite Urethane Adhesives", pp. 1-6. (Year: 2018).*
UK Search Report for UK Patent Application No. GB2101499.8,mailed Oct. 22, 2021.
Industrial Adhesives & Tapes Division, 2020, "Battery Bonding Guide" URL: <https://multimedia.3m.com/mws/media/1826787O/battery-boding-brochure.pdf> pp. 1-9.

* cited by examiner

BATTERY PACK HOUSING

FIELD OF THE DISCLOSURE

The present disclosure relates to a housing for a battery pack, and in particular but not exclusively, a battery pack for electric or hybrid electric vehicles. The present disclosure is particularly concerned with techniques for attaching a panel to a surround frame of a battery pack housing.

BACKGROUND

Electric vehicles and hybrid electric vehicles, such as cars (automobiles), buses, vans and trucks, typically use battery packs that are designed with a high ampere-hour capacity in order to give power over sustained periods of time. A battery pack comprises a large number of individual electrochemical cells connected in series and parallel to achieve the total voltage and current requirements. To assist in manufacturing, assembly and servicing, the cells in a battery pack may be grouped into modules. The modules may include a support structure and a battery management unit to manage cell charge and discharge. A battery management system may be provided to manage module charge and discharge. The battery modules and battery management system together with other components of the battery pack are typically contained within a housing.

Known battery pack housings typically comprise a surround frame, a top panel and a bottom panel. The surround frame may provide the main structural part of the housing. The top panel and the bottom panel are typically attached to the surround frame using a gasket and a plurality of bolts. An inwardly extending flange is usually provided at the top and bottom of the surround frame to provide a surface which interfaces with the panel. The flange receives the gasket and the bolts which are used to bolt the panel to the frame.

When assembling a battery pack, the battery modules are normally inserted into the battery pack from above, before attaching the top panel. Furthermore, when servicing a battery pack, the top panel may be removed to allow the removal and replacement of battery modules within the battery pack. Thus, it may be necessary to ensure that the frame allows sufficient space for the insertion and/or removal of battery modules.

In many applications, such as electric vehicles, it is desirable to optimize the use of space within the battery pack in order to improve its energy density. In particular, it may be desirable to reduce the width of the battery pack without reducing the number of battery cells. However, the need to provide a flange on the surround frame for attaching the top panel may restrict the size of the opening which is available for inserting battery modules into the battery pack. This may lead to a less than optimal use of space within the battery pack. On the other hand, attempts to reduce the size of the flange may compromise structural integrity of the battery pack and/or the seal between the top panel and the frame.

It would therefore be desirable to provide a battery pack in which use of space within the battery pack can be optimized without compromising structural integrity or the seal between the top panel and the frame.

SUMMARY

According to one aspect of the present disclosure there is provided a battery pack housing for a battery pack comprising a plurality of battery cells, the battery pack housing comprising:

a surround frame, the surround frame comprising a plurality of walls arranged to surround the battery cells; and a top panel which is attached to the walls of the surround frame to form the top of the battery pack housing, wherein the top panel is attached to the surround frame using an adhesive, and the top panel is removable from the surround frame to allow access to internal components of the battery pack.

The present disclosure may provide the advantage that, by attaching the top panel to the surround frame using adhesive, it may be possible to reduce the contact area between the panel and the frame. This may increase the size of the opening which is available for inserting battery modules when the top panel is not attached, which may allow more efficient use of the space within the housing. Furthermore, this may be achieved without compromising structural integrity of the battery pack and/or the seal between the top panel and the frame. In addition, the use of adhesive can allow a continuous joint to be provided around the periphery of the surround frame, which may improve the shear transfer capacity and help to improve the torsional stiffness. As well as helping to provide load transfer, a continuous seal may also help with ingress protection. The disclosure may also help to provide a more lightweight and cost-effective design, by avoiding the need for bolts and a gasket, reducing the size of or eliminating the flange on the surround frame and/or reducing the overall size of the surround frame. Arranging the top panel to be removable may allow top-down access to internal components of the battery pack.

In one embodiment, the battery pack comprises a plurality of battery modules, each of which may comprise a plurality of battery cells. This may facilitate manufacturing, assembly, servicing and/or remanufacturing of the battery pack. In this case, removal of the top panel from the surround frame may allow access to the battery pack for inserting and/or removing battery modules. However, if desired, the cells could be provided within the battery pack without the cells being grouped together in modules. In this case, removal of the top panel from the surround frame may allow access to the battery pack for inserting and/or removing battery cells. In either case, the cells may be any type of battery cell, such as prismatic, pouch or cylindrical.

The battery pack housing may be generally in the form of a polyhedron, such as a rectangular cuboid. Thus, the battery pack housing may comprise a front wall, a rear wall, two side walls, a top and a bottom. This may facilitate stacking of the battery pack and/or its integration in the end application such as an electric or hybrid electric vehicle. However, other shapes other than a cuboid could be used instead.

The surround frame may have any appropriate number of walls, such as 3, 4, 5, 6 or more. In one embodiment, the surround frame comprises four walls arranged to surround internal components of the battery pack, which may include battery modules. For example, the surround frame may form the front wall, rear wall and side walls of the housing. In some examples a bottom panel is attached to the bottom of the surround frame to form the bottom of the battery pack housing The walls of the surround frame are in some examples perpendicular to the top panel and/or the bottom panel. For example, when the battery pack is resting on a horizontal surface, the top panel may be in a horizontal plane and the walls of the surround frame may each be in a vertical plane.

In some examples, the surround frame provides the main structural component of the battery pack. This may allow a relative thin and light weight material to be used for the top panel. In one embodiment, the surround frame is a continuous stretch-bent frame. The surround frame, in some examples, may allow access to the battery pack for insertion and/or removal of a battery module or battery cell when the top panel is not attached.

The surround frame may comprise a flange and the top panel may be attached to the flange. Thus, the flange may provide a contact area between the panel and the surround frame. This may help to ensure that a sufficiently large surface area is provided for adhering the panel to the surround frame. The flange is, in some examples, an inwardly extending flange. The flange may also extend inwardly at the top of the surround frame. Additionally, in some examples, the flange is continuous around the perimeter of the surround frame, which may allow a continuous seal between the top panel and the surround frame to be provided.

In some examples, the flange does not include bolt holes for attaching the top panel to the surround frame. This can allow the flange to be smaller than would otherwise be the case, allowing a larger opening for the insertion and removal of battery modules or other components, and thus allowing more efficient use of the space within the housing.

In some embodiments, it may be possible for the top panel to be attached directly to the surround frame without the need for a flange. This may be possible, for example, where the wall of the surround frame is sufficiently thick to provide an adequate surface area for adhering the top panel to the surround frame.

In some examples, the top panel is substantially planar. This may allow a substantially flat surface to be provided, which may facilitate adhesion of the panel to the surround frame and may facilitate stacking of the battery pack. However, the panel may have some corrugations or relief patterns, which may help to provide stiffness.

The adhesive is, in some examples, a structural adhesive. A structural adhesive is, for example, one that can be used to produce a load-bearing joint. For example, the adhesive may have a lap shear strength of more than 1 MPa and, in some examples, more than 10 MPa.

The adhesive may be, for example, an acrylic, epoxy or urethane adhesive. In one embodiment, the adhesive is an acrylic adhesive. Acrylic adhesives have been found to be able to achieve high shear strength with minimal surface preparation and relatively fast curing times. However, any other suitable type of adhesive, such as epoxies, toughened acrylics, polyurethanes, cyanoacrylates, anaerobics, phenolics or vinyl acetates, or any combination thereof, may be used instead or as well.

In some examples, the adhesive provides a continuous seal between the panel and the surround frame. By continuous seal it is, for example, meant that the seal is continuous around a periphery of the panel and/or surround frame. In some examples, the adhesive substantially covers a contact area between the panel and the surround frame. For example, the adhesive may have a width, measured across of the contact area, of at least 1 mm, 5 mm, 10 mm or 15 mm and/or a width of less than 50 mm, 40 mm, 30 mm or 25 mm.

The continuous seal may help to provide ingress protection, for example, water ingress protection. Furthermore, use of a continuous seal may help to improve shear transfer capacity and/or torsional stiffness, and may avoid the need for a gasket. The seal is, in some examples, around the periphery of the top panel and/or surround frame.

During the production process, the top panel may be adhered to the surround frame by applying an adhesive bead to the surround frame and/or the top panel, and then bringing the two together. For example, an adhesive bead with a width greater than 0.5 mm, 1 mm, or 2 mm and/or less than 7 mm, 6 mm or 5 mm may be applied. In one embodiment, an adhesive bead with a width of around 3 mm may be applied. Once the top panel and the surround frame have been brought together, pressure may be applied to hold the two together while the adhesive cures. This may be achieved, for example, by means of a frame which clamps the top panel to the surround frame to compress the adhesive along the bond line. This may provide a convenient way of holding the top panel in place during the curing process, which may require less pressure to be applied than if bolts and a gasket were used for the joint. Once the adhesive has cured, the frame can be removed. When the frame is removed, the adhesive tensile strength ensures the joint is still functioning without the need for mechanical compression via additional fasteners. This is advantageous compared with a typical gasket type of sealant that requires compression throughout application and use to function.

In use, it may be desirable for the battery pack to meet certain electromagnetic emissions standards. This may be achieved by providing a battery pack housing which functions as a Faraday cage, that is, as an enclosure to at least partially block electromagnetic fields. This may be achieved by forming the top panel and surround frame (and if appropriate the bottom panel) at least partially from an electrically conductive material, such as a metal, and ensuring that a gap between the top panel and the surround frame is sufficiently small. Thus, the adhesive may have a thickness between the top panel and the surround frame sufficiently small to allow the battery pack housing to function as a Faraday cage. For example, the adhesive may have a thickness between the top panel and the surround frame of less than 2 mm, 1.5 mm, 1 mm, or 0.5 mm, although other values could be used instead. This may help to ensure that the battery pack meets the appropriate emissions standards. For example, in the case of a battery pack for an electric or hybrid electric vehicle, the dBuV (decibels-microvolt) is, in some examples, at an acceptable level for the vehicle's electrical system.

In some examples, the adhesive provides load transfer capability between the top panel and the surround frame. This may help to ensure that the battery pack housing has sufficient stiffness. Thus, the strength of the adhesive may be chosen such that, on one hand, load transfer capability is provided between the top panel and the surround frame, and on the other hand the top panel can be removed, for example, by applying a perpendicular pulling force to the top panel.

If desired, additional fixtures may be used to hold the panel in place on the surround frame during the curing process and/or to supplement the strength of the adhesive. For example, fixtures such as self-piecing rivets or spot welding could be added. Thus, the panel may be attached to the surround frame using at least one fixture in addition to the adhesive. This may avoid or reduce the need for fixturing during the curing process.

Battery packs for applications such as electric vehicles tend to degrade during use due to the arduous duty cycles that are typically encountered. When the battery packs no longer meet electric vehicle performance standards they may need to be replaced. In this case, it may be desirable from an environmental and cost perspective to remanufacture the battery pack for use in other, typically stationary, applications such as power generation. Typically, different cells will have degraded at different rates and therefore it may be necessary to refurbish the battery modules as part of the remanufacturing process. This requires access to the battery modules to allow them to be serviced or replaced.

By arranging the battery pack housing such that the top panel is removable from the surround frame, access to the battery pack may be achieved for example to service or replace a battery module and/or as part of a remanufacturing process. This in turn may help to reduce the cost of ownership and the environmental impact of the battery pack.

In some examples, the adhesive has an adhesive strength sufficient to ensure that, on one hand, the panel remains adhered to the surround frame and provides the required load transfer strength while in use, while on the other hand allowing the panel to be lifted from the surround frame upon application of a pulling force above a certain value (for example, above approximately 50 N, 100 N or 150 N). Furthermore, the panel may be sufficiently flexible (able to sustain plastic deformation under tensile stress) to allow it to be bent as it is pulled away from the surround frame. Thus, the top panel may comprise a material with a ductility which allows the top panel to be removed from the surround frame by lifting the top panel from the surround frame.

In one embodiment, the housing is arranged such that the panel can be removed from the surround frame by rolling the panel. For example, the housing may be arranged such that the panel can be removed from the surround frame by attaching the panel to a torsion bar and rolling the panel around the torsion bar. The torsion bar is, in some examples, a bar which is arranged to apply a twisting force to the top panel. This may allow the panel to be lifted from the surround frame in a continuous manner by the leverage of winding the panel around the torsion bar. Thus, this may allow the panel to be removed in a convenient and controlled manner.

In one embodiment, a high elongation to failure material is used for the top panel to allow it to be adequately removed with the use of a torsion bar. For example, the material may have an elongation to failure of greater than 5% or 10%. A suitable material for the top panel has been found to be aluminium (aluminium) although other materials such as steel could be used instead.

The thickness of the top panel may be chosen to ensure the removal process can be completed without the need of excessive force. For example, in one embodiment, the thickness of the top panel is less than 3 mm or less than 2 mm or around 1.5 mm, although other values could be used instead.

In order to facilitate removal of the top panel from the surround frame, the top panel may include a protrusion (outside of the bond line) which is not adhered to the surround frame. For example, the top panel may include a tab which may extend outwardly of the adhesive. In this case, the tab may be lifted from the surround frame, in order to initiate the removal process. The tab may then be attached to a torsion bar, and the top panel rolled around the torsion bar in order to lift the top panel from the surround frame.

The tab is, in some examples, provided at a corner of the top panel. This may facilitate the removal process, by allowing the top panel to be lifted from the surround frame at a corner where the joint may be more easily broken.

The surround frame may comprise one or more protrusions, and the tab may be arranged to cover a protrusion on the surround frame. This may allow the tab to be within the profile of the surround frame, which may help to avoid unintentional lifting of the tab.

The surround frame may comprise one or more lifting and/or mounting points, to enable the battery pack to be lifted into place and/or secured in place. In this case, the tab may be arranged to cover a lifting and/or mounting point on the surround frame. The lifting and/or mounting point may be an area of the surround frame where it has additional thickness and/or additional strength to allow the battery pack to be lifted and/or mounted. For example, the lifting and/or mounting point may be in the form of a protrusion on the surround frame. In one example, the surround frame may comprise a protrusion at each corner, each of which may serve as a lifting and/or mounting point. The protrusions may extend in a generally longitudinal direction to avoid adding to the width of the battery pack. Provision of lifting and/or mounting points may facilitate stacking of the battery module. Arranging the tab to cover a lifting and/or mounting point on the surround frame may allow the tab to be within the profile of the surround frame by covering part of the frame which is already provided for other purposes.

If desired, the tab may be secured to the surround frame using a removable fixture such as a bolt. In this case the fixture may be removed prior to removal of the panel. The fixture may be for example a bolt which is used to secure the battery pack to a surface and/or another battery pack.

According to another aspect of the disclosure there is provided a battery pack comprising a plurality of battery cells and a battery pack housing in any of the forms described above. In some examples, the battery cells are grouped into battery modules. Each battery module, for example, comprises a plurality of battery cells, such as prismatic cells or pouch cells, which may be for example stacked side-by-side within the module.

The battery modules may be transverse orientated, that is, they may run across the width of the battery pack. For example, the battery modules may be arranged in rows, with each battery module spanning the battery pack from one side to the other. This may help to achieve efficient packing of the battery cells. However, other configurations, such as longitudinally orientated battery modules, are also possible.

In some examples, the surround frame is arranged such that the battery modules can be inserted into and/or removed from the battery pack when the top panel is not attached to the surround frame.

The battery pack may further comprise one or more cross members attached to the surround frame. In this case the top panel may additionally be attached to one or more cross members. For example, the panel may be attached to a cross member using adhesive and/or other fixture such as one or more bolts or rivets. This may help to minimize flexing or vibration in the top panel in use.

In any of the above arrangements, the battery pack may be a battery pack for an electric or hybrid electric vehicle. Thus, the battery pack may be used to supply power to the power train of an electric or hybrid electric vehicle. However, the battery pack may also be used in other applications, for example stationary applications such as storage in electrical power generation.

In some examples, the battery pack is a high voltage battery pack. For example, the battery pack may have a notional output voltage of greater than 50V, 75V, 100V or 150V, or some other value. In some embodiments, the battery pack may have a notional output voltage of, for example, 300V or 600V. This may make the battery pack suitable for use in traction applications such as electric or hybrid electric vehicles.

According to another aspect of the present disclosure there is provided a combination of a battery pack or a battery pack housing in any of the forms described above, and a removal tool for removing the top panel from the surround frame. In some examples, the removal tool comprises a torsion bar, and the top panel is arranged to be removed from the surround frame by rolling the top panel around the torsion bar.

Corresponding methods may also be provided. Thus, according to another aspect of the disclosure there is provided a method of assembling a battery pack housing for a battery pack comprising a plurality of battery cells, the battery pack housing comprising a surround frame, the surround frame comprising a plurality of walls arranged to surround the battery cells, and a top panel which is attached to the walls of the surround frame to form the top of the battery pack housing, the method comprising:

attaching the top panel to the surround frame using an adhesive; and removing the top panel from the surround frame to allow access to internal components of the battery pack.

The method may comprise attaching the top panel to a bar and rolling the top panel around the bar to lift the top panel from the surround frame. This may allow access to battery cells within the battery pack, for example as part of a servicing or remanufacturing process.

In some examples, a corner of the top panel is attached to the bar. Thus, the top panel may be lifted from the surround frame from a corner first. For example, the bar is rolled in a direction which is at a (non-zero) angle to the longitudinal direction of the housing. For example, the bar may be rolled in a direction which is at an angle of greater than 20°, 30° or 35° and/or less than 70°, 60° or 55°, or around 45°, to the longitudinal direction. This may facilitate the removal process by allowing the top panel to be lifted from the surround frame at a corner where the joint may be more easily broken.

The top panel may include a tab which is not adhered to the surround frame; in which case the method may comprise lifting the tab and attaching the tab to the bar before rolling the panel around the bar. The tab is, in some examples, provided at a corner of the panel.

The panel may be removed from the surround frame as part of a servicing and/or remanufacturing process. In this case, the servicing and/or remanufacturing process may further comprise attaching another top panel to the surround frame using adhesive. This step may be carried out once the battery pack has been serviced.

Features of one aspect of the disclosure may be provided with any other aspect. Any of the apparatus features may be provided as method features and vice versa.

BRIEF DESCRIPTION OF THE DRAWINGS

The features of the present disclosure according to some examples or embodiments will now be described, purely by way of example, with reference to the accompanying drawings, in which.

DETAILED DESCRIPTION

Overview of Battery Pack

Figure 1:
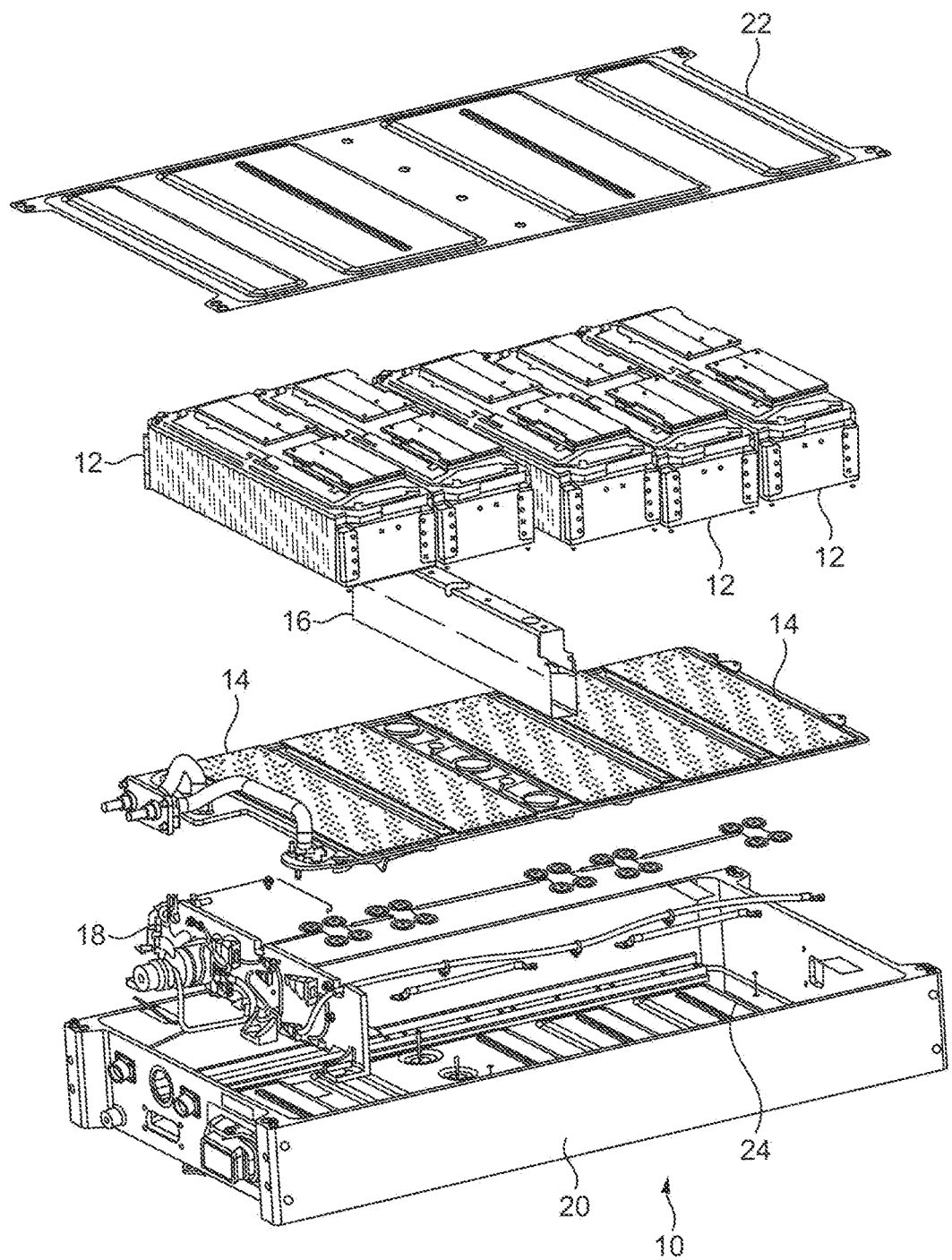
FIG. 1 is an exploded view of a battery pack.

FIG. 1 is an exploded view of a battery pack in accordance with embodiments of the disclosure. The battery pack of FIG. 1 is designed to be used with electric and hybrid vehicles, particularly in high horsepower applications as buses, trucks, vans, construction equipment, and so forth. However, the principles of the present disclosure may be applied to any type of battery pack for use in any suitable application such as power generation applications.

Referring to FIG. 1, the battery pack 10 comprises a plurality of battery modules 12, a plurality of cooling plates 14, a cross member 16, a battery management system 18, a surround frame 20, a top panel 22 and a bottom panel 24. In the assembled state, the battery modules 12, cooling plates 14, cross member 16 and battery management system 18 are housed inside the frame 20, top panel 22 and bottom panel 24. The surround frame 20 provides the main structural part of the housing. The cross member 16 is attached to the surround frame 20 and spans the frame from one side to the other in order to increase the structural rigidity of the battery pack. The top panel 22 and the bottom panel 24 are attached to the top and bottom respectively of the frame 20 and the cross member 16.

In this example, five battery modules 12 are provided through the length of the battery pack. The battery modules 12 are transverse orientated, that is, they run from side to side in the battery pack. Each of the battery modules 12 is located on a corresponding cooling plate 14. The cooling plates 14 are hollow to allow the flow of coolant. The battery management system 18 is located at one end of the battery pack. The battery management system 18 is used to manage charging and discharging of the battery modules, in cooperation with battery management units inside the battery modules. It will be appreciated that this particular configuration of battery pack is given by way of example only, and other configurations are possible. For example, the battery pack may comprise a different number of battery modules and/or a different configuration of battery modules, and other components may be omitted or configured differently, as appropriate.

Figure 2:
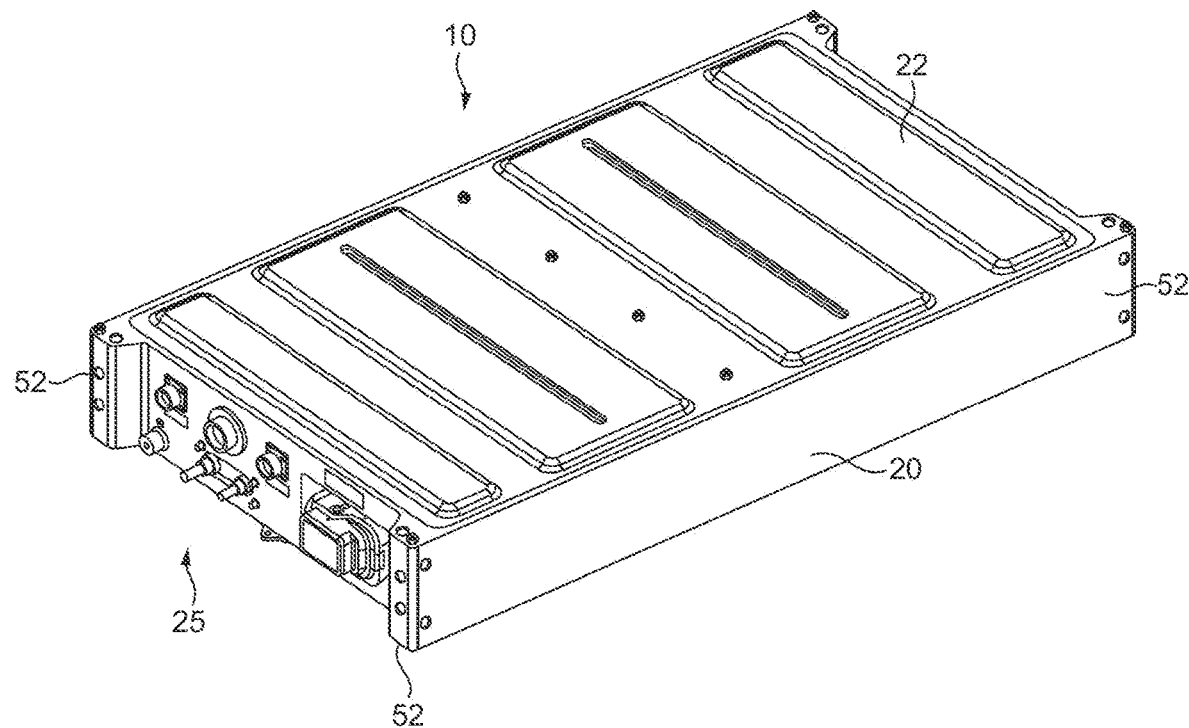
FIG. 2 shows an assembled battery pack.

FIG. 2 shows the assembled battery pack. The battery pack 10 is essentially in the form of a rectangular cuboid. The front, rear and two sides of the battery pack are formed from the surround frame, while the top and bottom are formed from the top panel and bottom panel respectively. The surround frame 20 includes protrusions 52 at each corner, which extend in a generally longitudinal (length) direction. The battery pack is arranged such that a plurality of battery packs can be stacked one upon the other, in order to provide the required voltage and power output. The protrusions 52 are used to provide lifting and mounting points for the battery pack. The front of the battery pack includes external connections 25, such as high voltage connections, communications connections, cooling ports and a manual service disconnect. These are located within the recess between the two protrusions 52 at the front of the frame 20.

Figure 3:
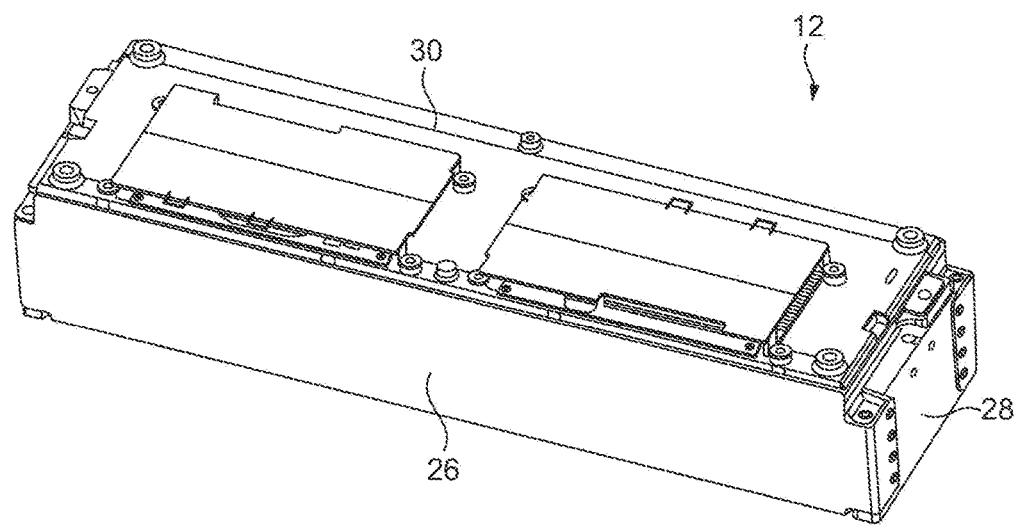
FIG. 3 shows a battery module.

FIG. 3 shows in more detail parts of a battery module of the type used in the battery pack of FIGS. 1 and 2. Referring to FIG. 3, in this example the battery module 12 comprises eighteen prismatic cells (not visible in FIG. 3) stacked together side-by-side. The prismatic cells are contained within a module housing 26. The module housing 26 runs around the outside of the cells and is used to physically hold the cells in place. The module housing 26 includes an expansion plate 28 which allows for a small amount of expansion of the cells when in use. A busbar 30 is provided on top of the cells. The busbar 30 electrically connects the cells in series and/or parallel to achieve the target module voltage. A battery management unit is integrated with the battery module 12 to monitor and manage cell charge and other aspects of cell operation.

In this example, the battery module comprises eighteen prismatic cells stacked together side-by-side. However, it will be appreciated that this arrangement is given by way of example only, and other arrangements are possible. For example, a different number of cells could be used, other types of battery cell, such as pouch cells or cylindrical cells, could be used, the cells could be stacked in different ways and/or the cells could be electrically connected in different ways.

An advantage of using a battery pack with a plurality of battery modules is that individual modules and/or cells can be replaced should they fail without the need to replace the whole battery pack. This is typically achieved by removing the top panel to gain access to the battery modules.

Top Panel Attachment Process

Figure 4:
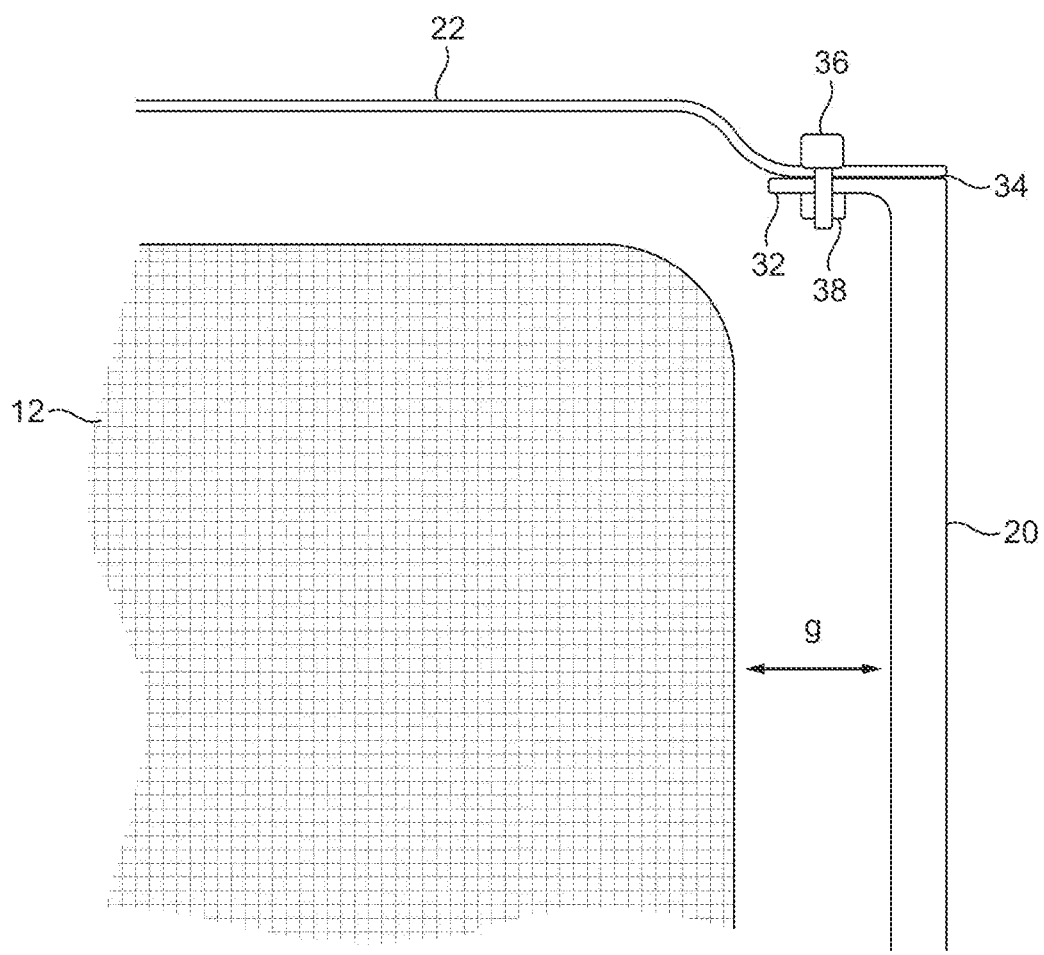
FIG. 4 is a cross section through part of a previously considered battery pack.

FIG. 4 is a cross section through part of a battery pack, illustrating a previously considered approach for attaching the top panel to the surround frame. Referring to FIG. 4, the battery pack comprises battery module 12, surround frame 20 and top panel 22. The surround frame includes a flange 32 which extends inwards at the top of the battery pack. A gasket 34 is provided between the top panel 22 and the flange 32. The top panel 22 is attached to the surround frame 20 using a plurality of bolts 36. The bolts pass through the top frame 22, gasket 34 and flange 32, and are secured with nuts 38 which are typically welded to the underside of the flange.

The arrangement of FIG. 4 can allow the top panel to be removed to gain access to the battery modules. For example, if it is necessary to service or replace a battery module, then the bolts in the top panel would be undone and the top panel removed to allow access to the module. This can allow a battery module to be removed and replaced though the opening left by the top panel. Once servicing is complete, the top panel is replaced on the frame and reattached using the bolts.

When assembling a battery pack such as that shown in FIGS. 1 and 2, the normal sequence is first to attach the bottom panel 24 to the surround frame, then to insert the internal components of the battery pack from above, and finally to attach the top panel 22 to the surround frame 20 and cross member 16. It is therefore necessary for the top of the surround frame to have a sufficiently wide opening to allow the battery modules 12 and other internal components to clear the frame as they are inserted. Furthermore, if battery modules are to be removed for servicing or replaced, then it must also be possible for them to clear the top of the surround frame as they are removed and replaced.

Referring to FIG. 4, it can be seen that, in order to insert or remove a battery module, the module must be able to clear the flange 32 at the top of the surround frame 20. Since the flange extends inwards, it is necessary for the battery modules 12 to have a width that is somewhat less than the width of the surround frame 20. As a consequence, a gap g is left between the battery module and the surround frame when it is in the battery pack.

A key measurable of the competitiveness of a battery pack, in particular for vehicular applications, is its energy density. It is therefore desirable to optimize the use of space within the battery pack. However, the need to leave a gap between the battery modules and the surround frame results in a less than optimal use of space, reducing the energy density. Previous attempts to reduce the width of the battery pack have either reduced the ease of manufacture or servicing of the pack, by making it difficult to insert and remove battery modules or have required one or more cells to be removed from the battery modules. On the other hand, attempts to reduce the size of the flange have tended to compromise the seal between the top panel and the frame and/or the structural integrity of the battery pack.

Figure 5:
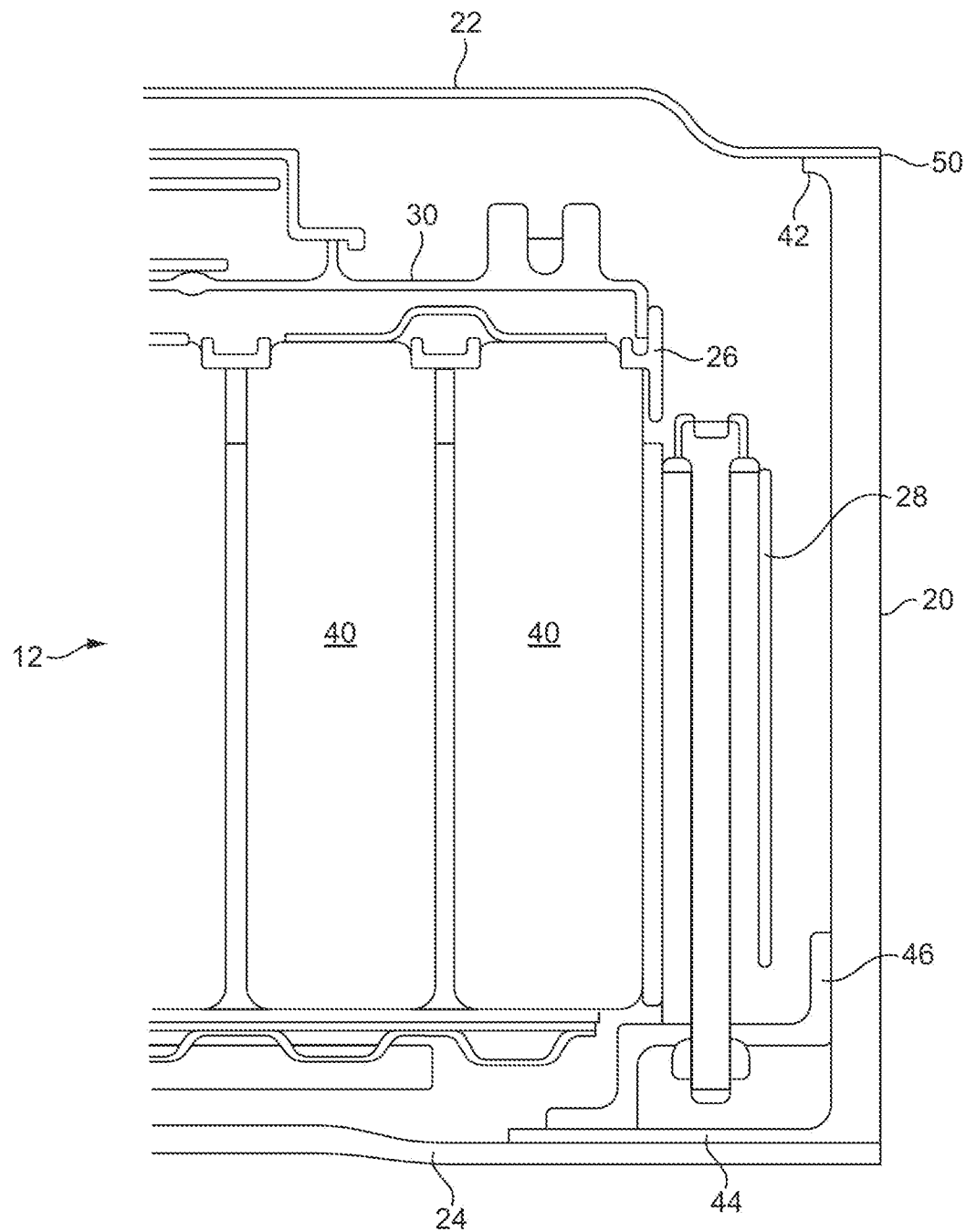
FIG. 5 is a cross section through part of a battery pack in an embodiment of the disclosure.

FIG. 5 is a cross section through part of a battery pack in an embodiment of the disclosure. Referring to FIG. 5, part of a battery module 12 is visible, along with part of the surround frame 20, top panel 22 and bottom panel 24. The battery module 12 comprises a plurality of prismatic battery cells 40, module housing 26, expansion plate 28 and busbar 30. The surround frame 20 includes a top flange 42 which extends inwards at the top of the battery pack, and a bottom flange 44 which extends inwards at the bottom of the battery pack. The top panel 22 and the bottom panel 24 are attached to the top and the bottom respectively of the surround frame 20. A module rail 46 is provided for attaching the battery module 12 to the surround frame.

In the arrangement of FIG. 5, a structural adhesive 50 is used to attach the top panel 22 to the surround frame 20. It has been found that, by using a structural adhesive, the width of the top flange 42 can be reduced in comparison to the flange 32 of FIG. 4, without compromising the structural integrity of the battery pack. This in turn can allow a smaller gap to be left between the battery modules and the surround frame. This allows more of the internal space to be used for cell packaging, thereby increasing the energy density of the battery pack.

Structural adhesives are not usually considered suitable for this type of joint in battery packs from a product lifecycle perspective. However, in embodiments of the disclosure, techniques are used to allow a cradle-grave approach for ensuring that not only does the joint function as intended in use, but that difficulties with pack manufacture, quality control and servicing, and remanufacture can be overcome.

Figure 6:
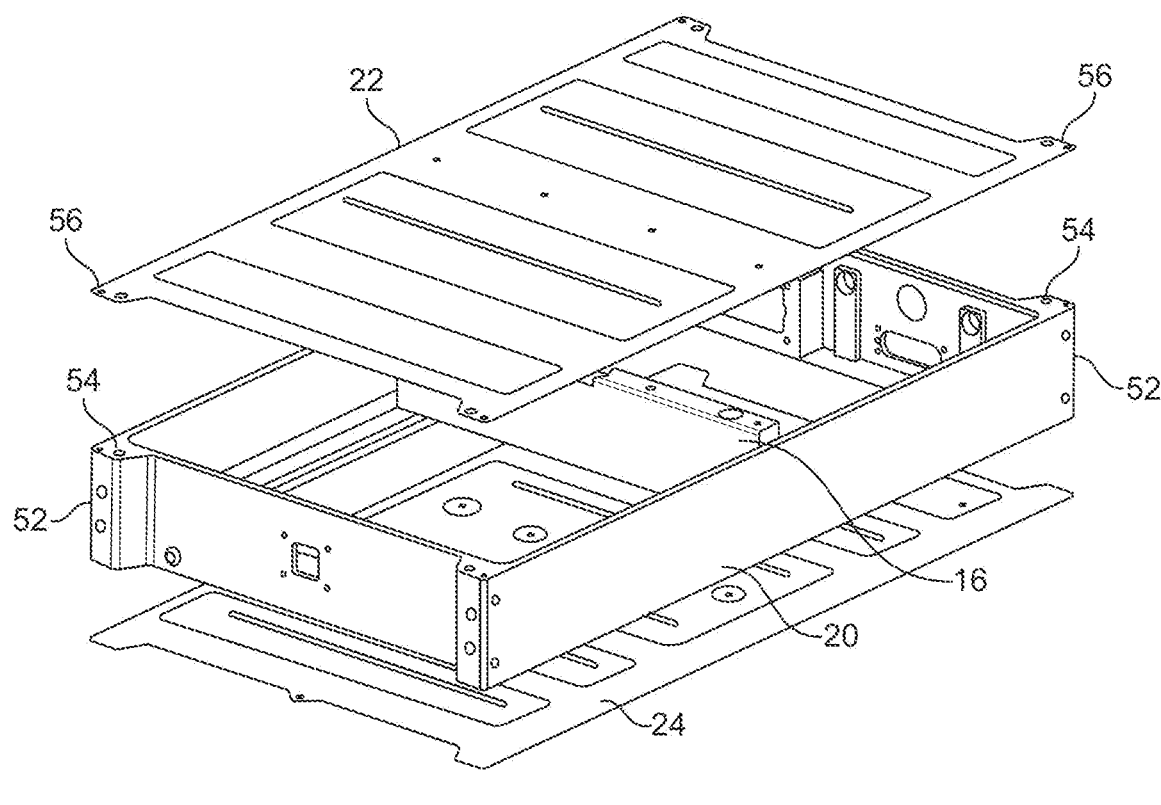
FIG. 6 shows parts of a battery pack housing in an embodiment of the disclosure.

FIG. 6 shows parts of a battery pack housing in an embodiment of the disclosure. Referring to FIG. 6, the battery pack housing comprises surround frame 20, top panel 22 and bottom panel 24. The surround frame 20 comprises a front wall, two side walls and a rear wall which form four external walls of the battery pack. A cross member 16 extends between the two side walls and provides further stiffness. The surround frame 20 has an essentially rectangular shape when viewed from above, with a longitudinal (length) direction L, a transverse (width) direction W and a height direction H. The surround frame 20 includes protrusions 52 at each corner, which extend in a generally longitudinal direction. The protrusions 52 include holes 54 which are used to provide lifting and mounting points for the battery pack. The surround frame is typically manufactured from a metal such as aluminium, or any other suitable material.

The top panel 22 is essentially planar and has an essentially rectangular shape which corresponds to the perimeter of the top of the surround frame 20. The top panel includes tabs 56 at each corner, which correspond to the protrusions 52 in the surround frame. The tabs 56 include holes which correspond with the holes 54 in the surround frame to allow the battery pack to be lifted or mounted. The top panel may be made from a metal such as aluminium or steel, or any other suitable component.

In order to attach the top panel 22 to the surround frame 20, adhesive is first applied to the underside of the top panel. The adhesive is applied to those areas where the top panel overlaps with the flange of the surround frame. However, no adhesive is applied in the areas of the protrusions 52. As will be explained, this can facilitate the later removal of the top panel.

Figure 7:
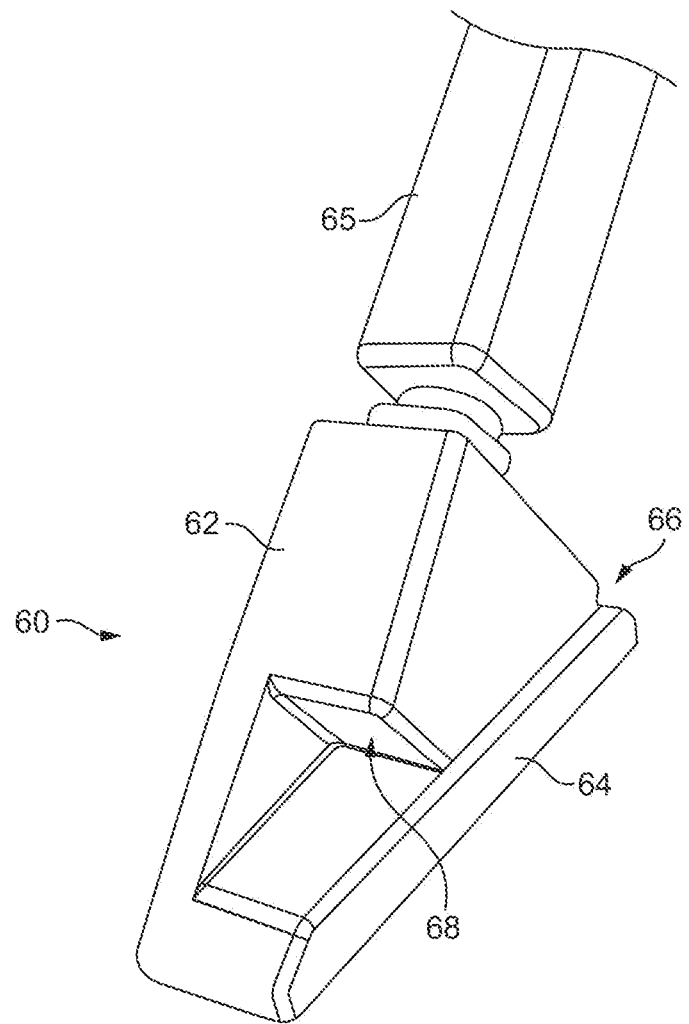
FIG. 7 shows an adhesive application tool.

FIG. 7 shows an adhesive application tool which can be used to apply adhesive to a top panel in one embodiment. The tool is designed to receive a glue gun, and to guide the application of adhesive from the glue gun to the underside of the top panel. Referring to FIG. 7, the tool 60 comprises a top portion 62 and a bottom portion 64 with a slot 66 between the two. The slot 66 is sized so as to fit over the edge of the top panel. The top portion 62 includes a through hole 68, which receives the nozzle 65 of a glue gun at one end and opens towards the slot at the other end. The through hole 68 is at an angle to the slot 66.

In use, the tool 60 is placed on an edge of the top panel, with the top portion 62 of the tool on the underside of the panel, the bottom portion 64 of the tool on the top side of the panel, and the slot 66 accommodating the edge of the panel. The tool is moved slowly around the perimeter of the top panel as adhesive is ejected from the glue gun. The adhesive is forced through the through hole 68 and onto the bottom side of the top panel as the tool is moved. The tool 60 is used to guide the glue gun to ensure that the adhesive is applied to the correct areas of the top panel. This allows the adhesive to be applied to the top panel in an even and consistent manner.

The size of the adhesive bead which is applied is chosen to ensure a continuous seal between the panel and the surround frame, with the adhesive covering at least the majority of the top surface of the flange 42, once the top panel has been applied to the surround frame. It has been found that a suitable width of the adhesive bead is between 2 mm and 5 mm, or around 3 mm, although it will be appreciated that other values could be used instead.

In the arrangement described above, adhesive is applied to the top panel in those locations where it will contact the surround frame, in order to provide a continuous seal. However, adhesive is not applied in the areas of the tabs 56. Instead, a continuous line of adhesive is applied to those parts of the top panel which are immediately inside of the tabs. Thus, once the adhesive has been applied, there is a continuous rectangle of adhesive around the outer edge of the underside of the top panel, not including the tabs 56.

Referring to FIG. 6, once the adhesive has been applied to the underside of the top panel, the top panel 22 is placed onto the surround frame 20 with all of the internal components of the battery pack already in place. The top panel is then clamped to the surround frame while the adhesive cures. In addition, bolts may be used to attach the top panel 22 to the cross member 16 and to attach the tabs 56 on the top panel to the protrusions 54 on the surround frame. If desired, the top panel may also be attached to the cross member 16 using adhesive as well as or instead of bolts.

In one embodiment, "picture" frame is used during manufacture to compress the adhesive along the bond line. Once the frame is removed, the adhesive tensile strength ensures the joint is still functioning without the need for mechanical compression via additional fasteners. This is advantageous compared with a typical gasket type of sealant that requires compression throughout application/use to function.

The amount of adhesive and the pressure applied during the curing process are chosen such that the adhesive gap has a bond line thickness between the surround frame and the top panel that is small enough to meet the desired electromagnetic emission limits. In one embodiment, the thickness if the adhesive is less than 0.5 mm, which may allow the dBuV to be at an acceptable level for the electrical system of a vehicle.

It will be appreciated that, rather than applying the adhesive to the top panel, the adhesive could instead be applied to the surround frame, or to both the top panel and the surround frame.

If desired, other types of fixture such as self-piecing rivets or spot welding could be added between the top panel and the surround frame to avoid or reduce the need for fixturing during the curing process, and to supplement the adhesive.

The bottom panel 24 may be attached to the surround frame 20 using adhesive in a similar way. However, since the bottom panel does not normally need to be removed, the bottom panel may use fixtures such as rivets or bolts as well or instead.

Tests carried out by the present applicant have found that using a structural adhesive to attach the top panel in the way described above may provide one or more of the following advantages:

- Increased energy density, due to more internal space being available for packaging battery cells.
- High torsional stiffness of the battery pack. This due to the continuity of the adhesive around the periphery of the frame, leading to maximum shear transfer capacity.
- Ability to withstand pressure spikes. For example, the battery pack may be able to withstand internal pressure spikes of, say 0.7 bar (70,000 Pa) or 1.0 bar (100,000 Pa) before bursting of a pressure vent.
- Electromagnetic compatibility (EMC). A small gap sufficient to minimize external electromagnetic interference (EMI) and noise is left between the battery module and the surround frame.
- Simultaneous load transfer and environmental sealing (ingress protection)

Types of Adhesive

A structural adhesive is one that can be used to produce a load-bearing joint. Typically, a structural adhesive is used for engineering applications where joints need to have lap shear strengths of greater than, for example, 1 MPa or 10 MPa. Structural adhesives are typically available in three main chemistries; epoxies, urethanes and acrylics.

In general, the type of structural adhesive is chosen to provide sufficient adhesive strength to ensure that, in use, loads can be transferred though the joint without the joint becoming compromised. However, in some embodiments, the panel is designed to be removable from the surround frame in order to service the battery pack. In this case, the choice of adhesive is a balance between achieving the desired joint strength, while allowing the panel to be lifted from the surround frame upon application of a pulling force above a certain value (for example, above approximately 50 N, 100 N or 150 N).

A variety of acrylic, epoxy and urethane types of adhesive were tested by the present applicant. It was found that acrylic types of adhesive were able to achieve high shear strength with little/no surface preparation and fast curing, while allowing later removal of the top panel. Furthermore, it was found that they could allow self-piecing rivets or spot welding to be added to avoid or reduce the need for fixturing during curing process. Thus, in one embodiment, an acrylic adhesive is used to attach the top panel to the surround frame.

In one embodiment a suitable adhesive was found to be Scotch-Weld™ Metal Bonder Acrylic Adhesive manufactured by the 3M™ company. However, any other suitable adhesive could be used instead. For example, any type of adhesive comprising epoxies, toughened acrylics, polyurethanes, cyanoacrylates, anaerobics, phenolics or vinyl acetates, or any other suitable adhesive, may be used instead or as well.

Top Panel Removal Process

During use of a battery pack, it is possible for one of the cells to become damaged or otherwise compromised. Furthermore, battery packs for electric vehicle applications tend to degrade during use and are typically designed for approximately ten years of life. When the battery packs no longer meet electric vehicle performance standards, which typically include maintaining 80% of total usable capacity, they may need to be replaced. However, the battery packs may still be usable in second life applications, which are typically stationary applications such as power generation.

An advantage of using a battery pack with a plurality of battery modules is that individual modules can be serviced or replaced should they fail without the need to replace the whole battery pack. This is typically achieved by removing the top panel to gain access to the battery modules. In the case of a top panel which is attached to the frame with bolts, the top panel can be removed by unscrewing the bolts and prising off the top panel. However, if the top panel is attached to the frame using adhesive, then it may not be possible to remove the top panel in this way.

Figure 8:
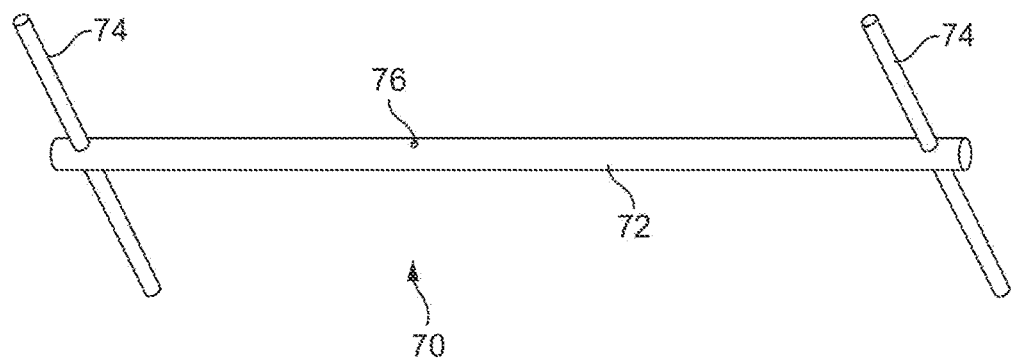
FIG. 8 shows a panel removal tool.

FIG. 8 shows a panel removal tool which can be used as part of a process to remove the top panel in an embodiment of the disclosure. Referring to FIG. 8, the tool 70 comprises a hollow metal bar 72 having a length which is greater than the diagonal of the top panel. Handles 74 are provided at each end of the bar 72. The handles 74 extend in a direction generally perpendicular to the length of the bar 72. The handles 74 may for example run through holes drilled through the bar 72. A tapped hole 76 is provided at the centre of the bar 72. The bar 72 and the handles 74 may be made of metal or any other suitable material.

In the arrangement shown in FIG. 8 the bar 72 and the handles 74 have a cylindrical cross section. However, the bars and handles may have any other cross section, such as square or hexagonal or any combination of cross sections, instead or as well. Furthermore, the handles may take other forms, such as a spider or a wheel.

Figure 9:
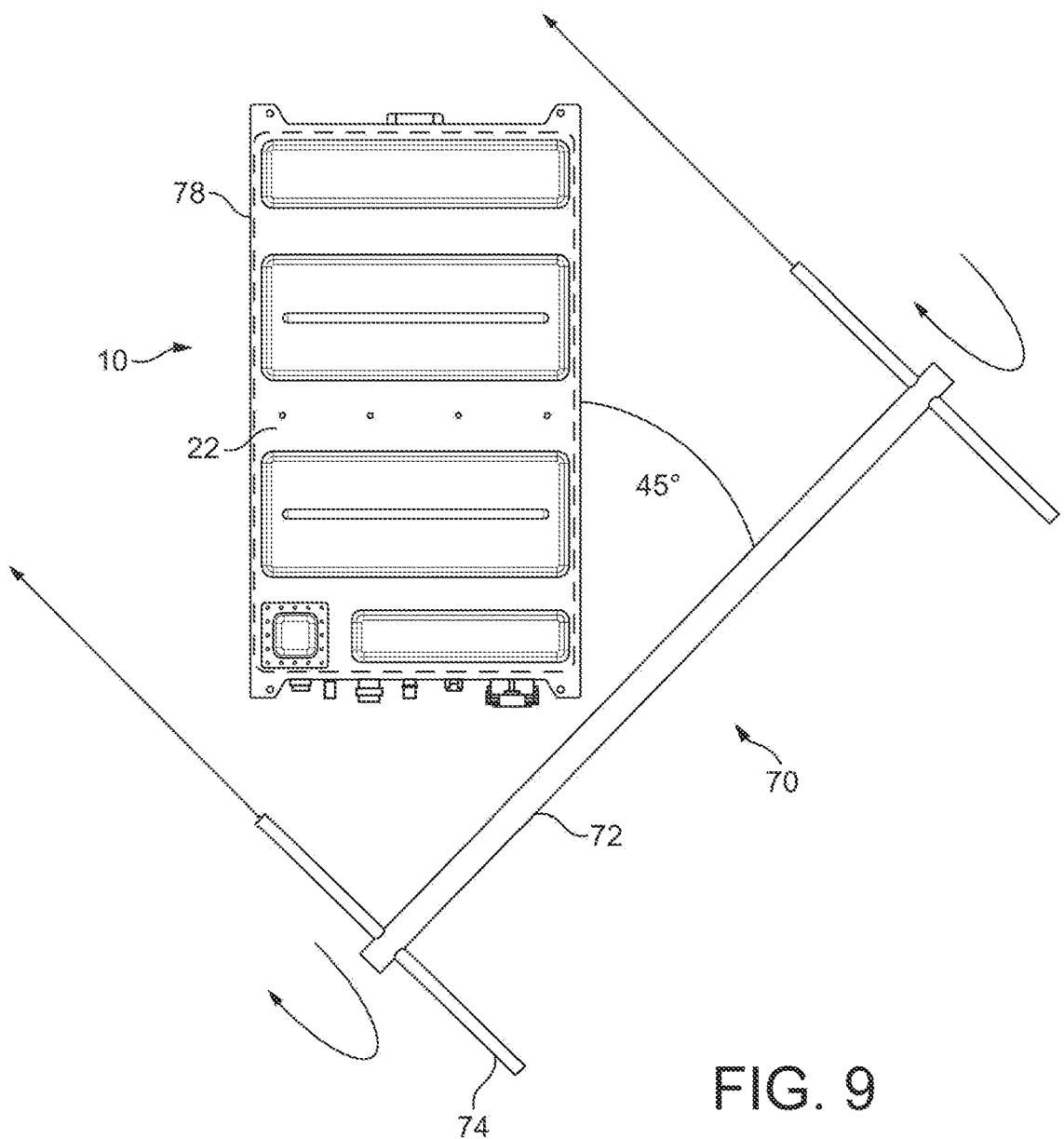
FIG. 9 illustrates a top panel removal process.

FIG. 9 illustrates the principle of the top panel removal process in one embodiment. Referring to FIG. 9, a top view of the battery pack 10 and removal tool 70 is shown, prior to removal of the top panel. The approximate position of the adhesive which is used to attach the top panel 22 to the surround frame is indicated by the dashed line 78. The bar 72 is placed at an angle of approximately 45° to the longitudinal direction of the battery pack. The top panel 22 is then attached to the bar 72. The handles 74 are then used to rotate the bar 72, as indicated by the arrows in FIG. 9. The bar 72 is rolled down the top of the battery pack at an angle of approximately 45° to the longitudinal direction. As a consequence, a perpendicular pulling force is applied progressively to the top panel as the bar rotates. This overcomes the strength of the adhesive joint, causing the top panel to be lifted off of the surround frame. The top panel 22 is then rolled around the bar 72 as the bar rotates. This process resembles the removal of the lid of a sardine can using a key.

Figure 10:
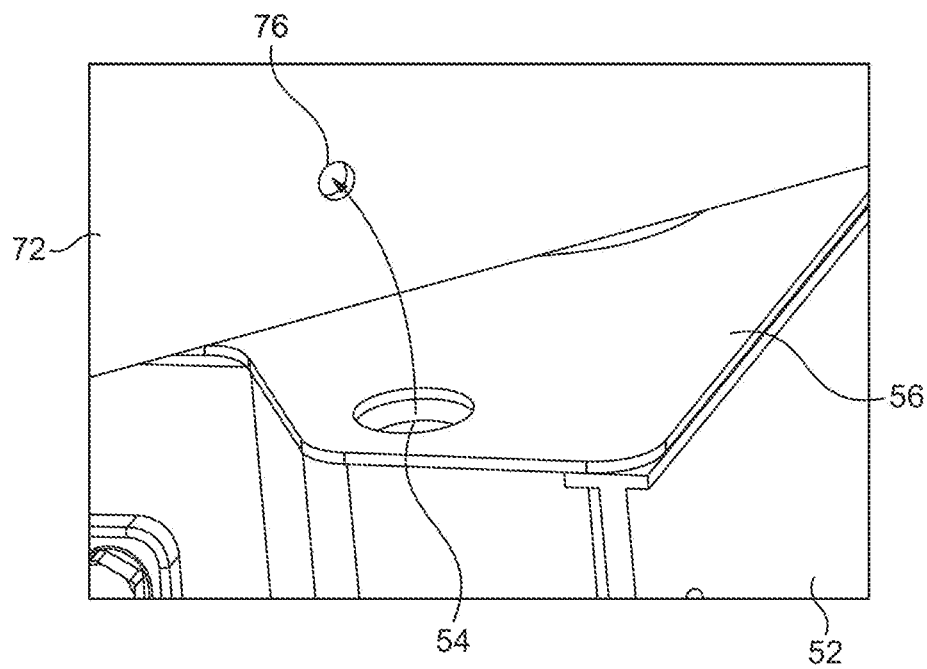
FIG. 10 illustrates attachment of the top panel to the panel removal tool.

In one embodiment, the following process is used to remove the top panel:

1. All top cover fixings, such as bolts, are removed.
2. The tab at a corner of the top panel is lifted up. Since the tab is not adhered to the surround frame, this process can be carried out using conventional tools, such as high voltage (HV) tools.
3. The tool 70 is placed on the corner of the battery pack 10 with the bar 72 at an angle of approximately 45°.
4. The corner of the top panel is attached to the bar 72 using a bolt. The bolt passes through the hole in the tab 56, and into the threaded hole 76 in the bar. This process is illustrated in FIG. 10.
5. A turning force is applied to the bar 72 using the handles 74, as shown in FIG. 9.
6. The turning force is maintained as the bar rolls across the top of the battery pack, lifting the top panel with it. A substantially constant turning force is applied to maintain tension and prevent the top panel from unwinding.
7. Once the top panel is completely lifted from the surround frame, the tool and top panel are removed from the battery pack.

With the top panel removed, access to the battery pack for servicing or replacement of the battery modules or other components is possible.

In one embodiment, a high elongation to failure material is used for the top panel to ensure that the top panel is able to be adequately removed with the use of a torsion bar. For example, the material may have an elongation to failure of less than 10%. The material may be for example, aluminium, steel or another appropriate metal. The thickness of the top panel is chosen to ensure that the removal process can be completed without the need of excessive force. For example, in one embodiment, the thickness of the top panel is around 1.5 mm.

When the battery pack is to be returned to service, a new top panel is attached to the surround frame using adhesive, using the techniques described above. The top panel is typically a relatively low-cost component, compared to other parts of the battery pack such as the battery modules, and thus the need to provide a new top panel does not add significantly to the cost of servicing the battery pack.

In the embodiments described above, the top panel is manufactured from a thin gauge, light weight metal, such as aluminium or steel, to facilitate its removal from the surround frame. As can be seen from FIGS. 1, 2, 6 and 9, the top panel is provided with some surface relief, in order to provide modal stiffness. However, the surface relief is designed to be benign, to allow rolling of the top panel around the bar.

It will be appreciated that embodiments of the present disclosure have been described above by way of example only, and modifications in detail will be apparent to the skilled person within the scope of the appended claims.

The invention claimed is:

1. A battery pack for an electric or hybrid electric vehicle, the battery pack comprising a plurality of battery cells and a battery pack housing, the battery pack housing comprising:
   a surround frame, the surround frame comprising a plurality of walls arranged to surround the battery cells; and
   a top panel which is attached to the walls of the surround frame to form the top of the battery pack housing, wherein:
      the surround frame comprises a flange and the top panel is attached to the flange;

the flange does not include bolt holes for attaching the top panel to the surround frame;
the top panel is attached to the flange using an adhesive;
the adhesive provides a continuous seal between the top panel and the surround frame;
the top panel is removable from the surround frame to allow access to internal components of the battery pack;
the top panel includes a tab which is not adhered to the surround frame;
wherein the tab comprises a tab hole; and
the tab is configured to be attached to a torsion bar by passing a bolt through the tab hole and into a threaded hole in the torsion bar such that when the torsion bar rotates the top panel is rolled around the torsion bar.

2. The battery pack housing of claim 1, wherein the battery pack comprises a plurality of battery modules, each of the battery modules comprising a plurality of battery cells, and removal of the top panel from the surround frame allows access to the battery pack for inserting and/or removing battery modules.

3. The battery pack housing of claim 1, wherein the surround frame provides the main structural component of the battery pack.

4. The battery pack housing of claim 1, wherein the top panel is substantially planar.

5. The battery pack housing of claim 1, wherein the adhesive is a structural adhesive with a lap shear strength of at least 1 MPa.

6. The battery pack housing of claim 1, wherein the adhesive is an acrylic, epoxy or urethane adhesive.

7. The battery pack housing of claim 1, wherein the adhesive has a thickness between the top panel and the surround frame sufficiently small to allow the battery pack housing to function as a Faraday cage.

8. The battery pack housing of claim 1, wherein the adhesive provides load transfer capability between the top panel and the surround frame.

9. The battery pack housing of claim 1, wherein the top panel is attached to the surround frame using at least one fixture in addition to the adhesive.

10. The battery pack housing of claim 1, wherein the top panel comprises a material with a ductility which allows the top panel to be removed from the surround frame by lifting the top panel from the surround frame.

11. The battery pack housing of claim 1, wherein the top panel is configured to be removed from the surround frame by attaching the top panel to the torsion bar and rolling the top panel around the torsion bar.

12. A combination of a battery pack and a panel removal tool, the battery pack comprising a plurality of battery cells and a battery pack housing, the battery pack housing comprising:
a surround frame, the surround frame comprising a plurality of walls arranged to surround the battery cells;
a top panel which is attached to the walls of the surround frame to form the top of the battery pack housing;
wherein:
the top panel includes a tab which is not adhered to the surround frame;
the tab comprises a tab hole;
the tab is configured to be attached to the panel removal tool by passing a bolt through the tab hole and into a threaded hole in the panel removal tool;
the surround frame comprises a flange and the top panel is attached to the flange;
the flange does not include bolt holes for attaching the top panel to the surround frame;
the top panel is attached to the flange using an adhesive;
the adhesive provides a continuous seal between the top panel and the surround frame; and
the top panel is removable from the surround frame to allow access to internal components of the battery pack; and
the panel removal tool comprising a torsion bar,
wherein the top panel and the torsion bar are configured such that the top panel can be removed from the surround frame by attaching the top panel to the torsion bar and rotating the torsion bar; and
wherein rotating the torsion bar causes the top panel to be rolled around the torsion bar, breaking the seal between the top panel and the surround frame.

13. The combination of the battery pack and the panel removal tool of claim 12, wherein the top panel includes a tab which is not adhered to the surround frame, and the tab is arranged to be attached to the torsion bar.

14. The combination of the battery pack and the panel removal tool of claim 13, wherein the tab is arranged to cover a protrusion on the surround frame.

15. The combination of the battery pack and the panel removal tool of claim 14, wherein the protrusion provides a lifting and/or mounting point for the battery pack.

16. The battery pack of claim 1, wherein the top panel is configured to be rolled around the torsion bar upon rotation of the torsion bar.

17. The battery pack of claim 1, wherein the seal is fluid-tight.

* * * * *